(12) United States Patent
Silveri

(10) Patent No.: US 12,319,233 B2
(45) Date of Patent: Jun. 3, 2025

(54) SUB-FRAME AND STEP ASSEMBLY FOR TRUCK

(71) Applicant: Michael John Silveri, Boca Raton, FL (US)

(72) Inventor: Michael John Silveri, Boca Raton, FL (US)

(73) Assignee: EM SIL Enterprises, Inc., Pompano Beach, FL (US)

( * ) Notice: Subject to any disclaimer, the term of this patent is extended or adjusted under 35 U.S.C. 154(b) by 616 days.

(21) Appl. No.: 17/691,917

(22) Filed: Mar. 10, 2022

(65) Prior Publication Data

US 2022/0194298 A1 Jun. 23, 2022

Related U.S. Application Data

(63) Continuation-in-part of application No. 16/798,006, filed on Feb. 21, 2020, now abandoned.

(60) Provisional application No. 62/808,517, filed on Feb. 21, 2019.

(51) Int. Cl.
  *B60R 3/00* (2006.01)

(52) U.S. Cl.
  CPC ............ *B60R 3/00* (2013.01); *B60R 3/007* (2013.01)

(58) Field of Classification Search
  CPC .. B60R 3/00; B60R 3/002; B60R 9/00; B60R 9/02; B62D 21/02; B62D 21/155; E02F 9/0833

USPC ....... 182/88; 280/163, 164.1, 769; 296/37.1, 296/37.6, 180.2, 193.07

See application file for complete search history.

(56) References Cited

U.S. PATENT DOCUMENTS

| | | | | |
|---|---|---|---|---|
| 1,453,362 | A * | 5/1923 | Loveland | B60R 11/06 224/538 |
| 6,971,657 | B2 * | 12/2005 | King | B60R 3/00 182/127 |
| 7,118,150 | B2 * | 10/2006 | Bruford | B60R 3/02 296/37.1 |
| 10,202,157 | B2 * | 2/2019 | Cox | B62D 65/02 |
| 2020/0166305 | A1 * | 5/2020 | Eliasson | B62D 33/077 |

* cited by examiner

*Primary Examiner* — Jason S Daniels
(74) *Attorney, Agent, or Firm* — James David Johnson; Johnson & Martin, P.A.

(57) ABSTRACT

An assembly is described for connecting a step or other components to a tow truck or other commercial truck using a sub-frame. The sub-frame includes chassis connection elements that are attached to a chassis of the truck and support elements that extend perpendicularly away from the chassis toward left and right sides of the truck so that the step, a toolbox, or other components may be attached thereto. The step is installed at a height that allows access by a user standing thereon to a bed of the truck and to any items located on the truck bed. The assembly may also include a rear bracket assembly for attaching rear fenders to the truck.

18 Claims, 9 Drawing Sheets

SUB-FRAME AND STEP ASSEMBLY FOR TRUCK

CROSS REFERENCE TO RELATED APPLICATIONS

This application is a continuation-in-part nonprovisional application of and claims priority from U.S. nonprovisional patent application Ser. No. 16/798,006 filed on Feb. 21, 2020, which is a nonprovisional application of U.S. provisional patent application Ser. No. 62/808,517 filed on Feb. 21, 2019. The foregoing applications are incorporated in their entirety herein by reference.

FIELD OF THE INVENTION

The invention relates to improvements for a tow truck or other commercial truck. More particularly, the invention relates to a step assembly that is connected to a tow truck or other commercial truck using a sub-frame.

BACKGROUND

Tow trucks and other commercial truck vehicles lack a step or other means to access a bed of the vehicle that is used for hauling vehicles or other cargo. Such trucks often also lack a toolbox capable of storing tools useful to the driver. In addition, the construction of such vehicles often leaves them unstable due to flexing of their frames.

A need exists for tow trucks and other commercial truck vehicles having a step so that a person may step up and stand upon the step to reach a bed of the truck. A need also exists for a means for attaching a toolbox to an exterior of a tow truck or other commercial truck vehicle. A further need exists for a stabilized frame for use in an assembled tow truck or other commercial truck vehicle.

SUMMARY

The invention relates to an assembly (also referred to herein as a truck sub-frame and step assembly) for connecting a step to a tow truck or other commercial truck using a sub-frame. The sub-frame is connected to a chassis, or frame, of a truck, and the step (and any other components such as, for example, a toolbox) is installed onto the sub-frame. The step is installed at a height that allows access by a user standing thereon to a bed of the truck and to any items located on the truck bed, e.g., to another vehicle that is located on a flatbed of a tow truck. The assembly also can feature a toolbox installed on the sub-frame at a side of the tow truck. Left and right versions of the assembly can be made for installation on left and right sides of the truck, respectively.

The sub-frame and step assembly can be installed on a truck during manufacturing or may be supplied as a kit or a collection of separate parts that are installed after manufacturing, e.g., by a user, mechanic, body shop, or other party.

The truck sub-frame and step assembly provides an advantage by providing tow trucks and other commercial truck vehicles with a step so that a person may step up and stand upon the step to reach a bed of the truck and any vehicle or cargo that is located on the bed. The truck sub-frame and step assembly provides another advantage by providing a means for attaching a toolbox to an exterior of a tow truck or other commercial truck vehicle. A further advantage is provided by the truck sub-frame and step assembly, by providing a stabilized frame for use in an assembled tow truck or other commercial truck vehicle.

Accordingly, the invention features a sub-frame and step assembly having a sub-frame capable of installation on a chassis of a truck and at least one step assembly connected to the sub-frame at a height that allows access by a user standing thereon to a bed of the truck.

In another aspect, the invention can feature the sub-frame including at least two lateral beams and at least two longitudinal beams installed perpendicularly across a top surface of each of the at least two lateral beams thereby forming a channel area between the at least two longitudinal beams.

In another aspect, the invention can feature the sub-frame including three lateral beams and two longitudinal beams installed perpendicularly across a top surface of each of the lateral beams thereby forming a channel area between the at least two longitudinal beams.

In another aspect, the invention can feature each lateral beam having top and bottom surfaces having a width that is greater than a height of each side surface of each lateral beam.

In another aspect, the invention can feature each longitudinal beam having left and ride sides having a height that is greater than a width of top and bottom surfaces of each longitudinal beam.

In another aspect, the invention can feature the sub-frame being installed by connection to a bottom surface of the chassis of the truck.

In another aspect, the invention can feature the sub-frame fitting longitudinally around a bottom surface of the chassis of the truck so that, when installed, a channel area of the sub-frame at least partially surrounds the chassis and extends parallel to the chassis.

In another aspect, the invention can feature the channel area being or including a space having sides defined between the at least two longitudinal members and a bottom defined by the at least two lateral members connected perpendicularly across a bottom surface of each longitudinal member.

In another aspect, the invention can feature a toolbox installed on the sub-frame.

In another aspect, the invention can feature the truck being a flatbed tow truck.

In another aspect, the invention can feature the at least one step assembly being or including a horizontal platform on which the user steps up and onto and stands or walks upon for accessing the bed of the truck, an object on the bed, or a toolbox connected to the truck.

The invention also features a truck having a sub-frame installed on a chassis of the truck and at least one step assembly connected to the sub-frame, wherein the at least one step assembly is or includes a standing platform, a toolbox, or both.

In another aspect, the invention can feature the sub-frame including at least two lateral beams and at least two longitudinal beams installed perpendicularly across a top surface of each of the at least two lateral beams thereby forming a channel area between the at least two longitudinal beams.

In another aspect, the invention can feature each lateral beam having top and bottom surfaces having a width that is greater than a height of each side surface of each lateral beam.

In another aspect, the invention can feature each longitudinal beam having left and ride sides having a height that is greater than a width of top and bottom surfaces of each longitudinal beam.

In another aspect, the invention can feature the sub-frame being installed by connection to a bottom surface of the chassis of the truck.

In another aspect, the invention can feature the sub-frame fitting longitudinally around a bottom surface of the chassis of the truck so that, when installed, a channel area of the sub-frame at least partially surrounds the chassis and extends parallel to the chassis.

In another aspect, the invention can feature the channel area being or including a space having sides defined between the at least two longitudinal members and a bottom defined by the at least two lateral members connected perpendicularly across a bottom surface of each longitudinal member.

The invention also features a kit for adding a step platform to a flatbed truck, the kit including a sub-frame connectable on a chassis of a truck and at least one step assembly connectable to the sub-frame at a height that allows access by a user standing thereon to a bed of the truck.

The invention also features a method for enabling access to a bed of a flatbed truck, the method including the steps of: (a) installing a sub-frame to a chassis of a truck; and (b) connecting at least one step assembly to the sub-frame at a height that allows access by a user standing thereon to a bed of the truck.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1:
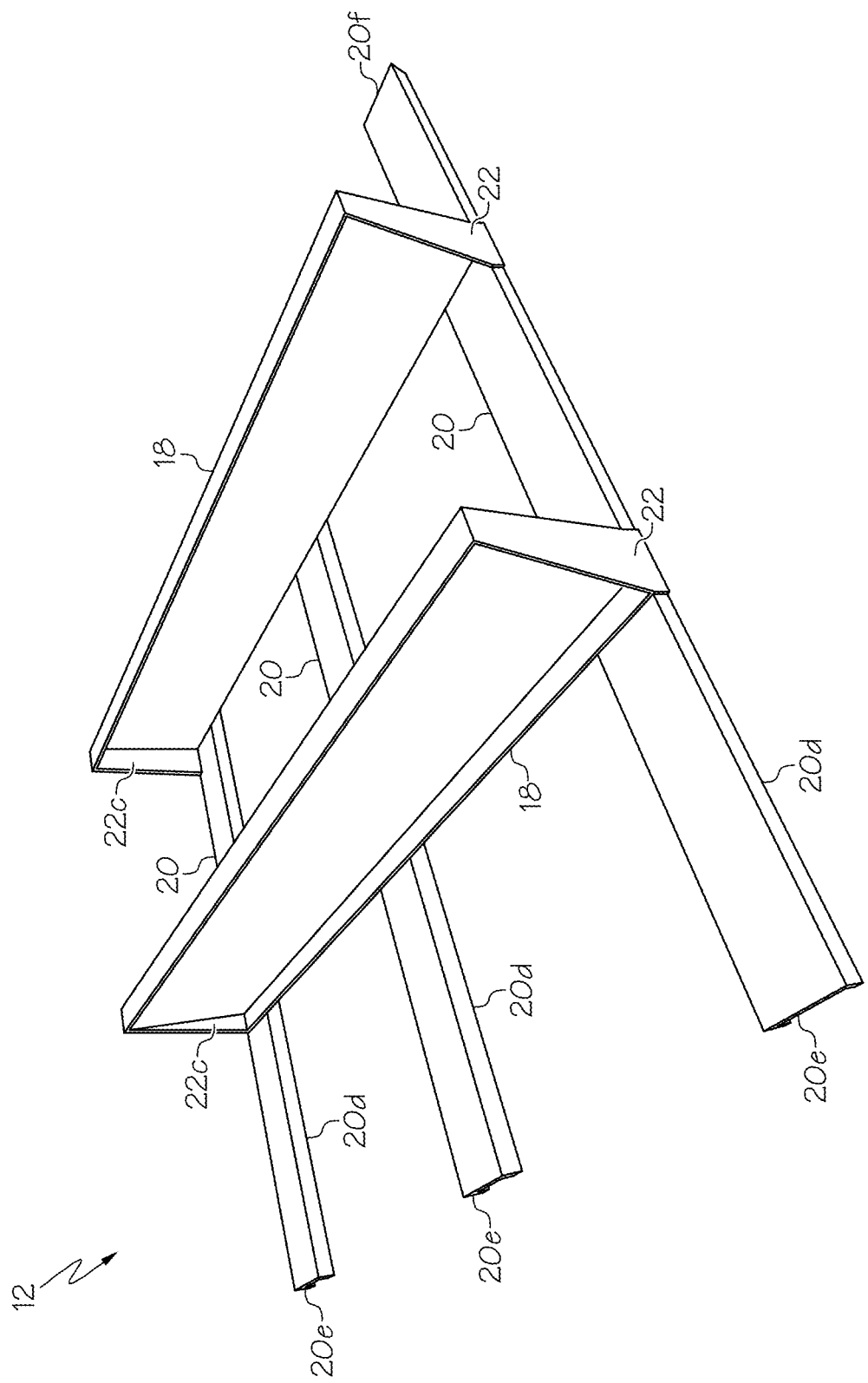
FIG. 1 is a perspective view of a sub-frame of a sub-frame and step assembly that is installable on a chassis of a truck, e.g., a flatbed truck.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

Figure 7:
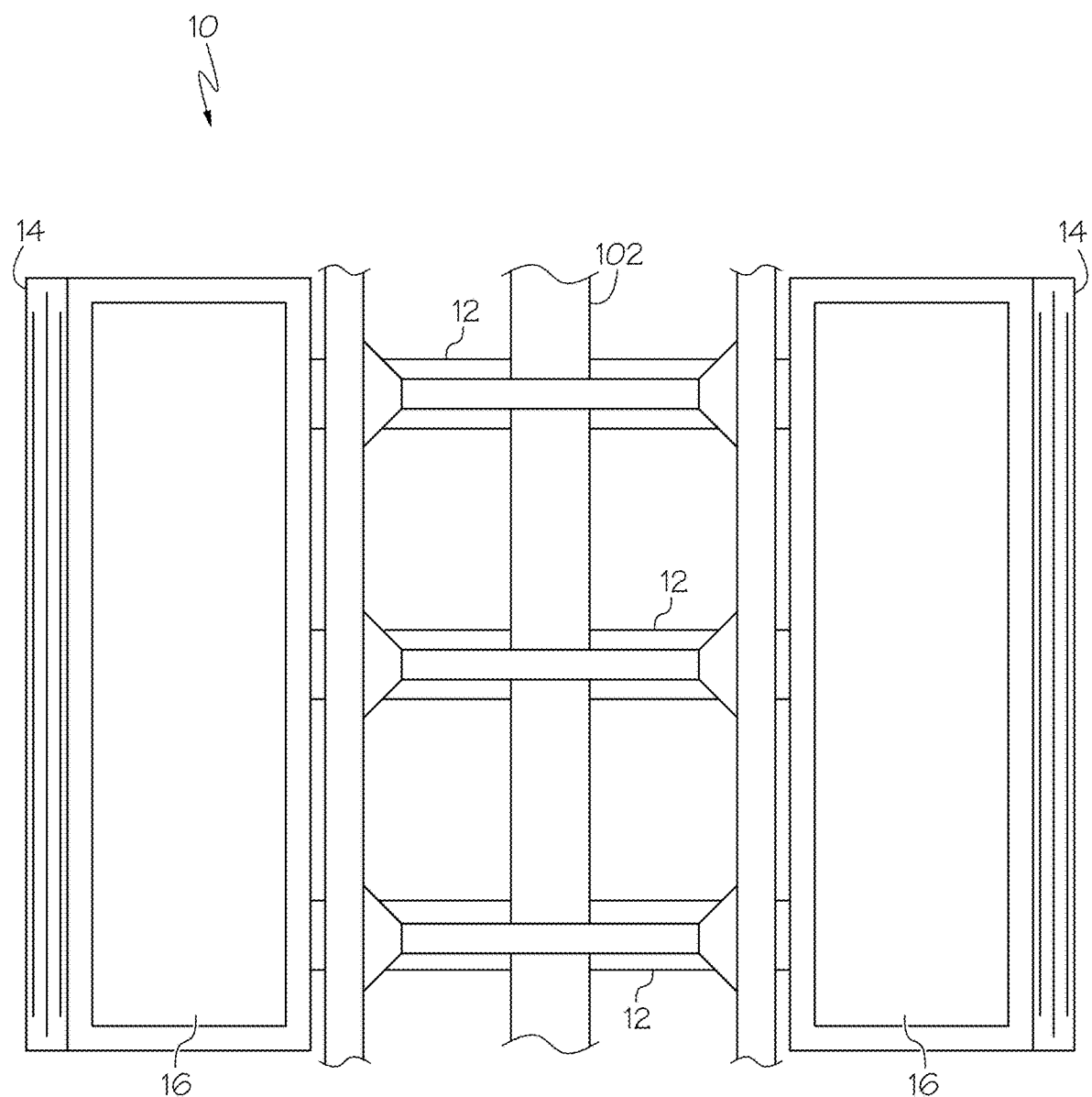
FIG. 7 is a top plan view of a sub-frame of a sub-frame and step assembly that is installed on a chassis of a truck with step assemblies, each having a toolbox, installed on left and right sides of the sub-frame. The bed of the truck is not shown in this view.
Figure 8:
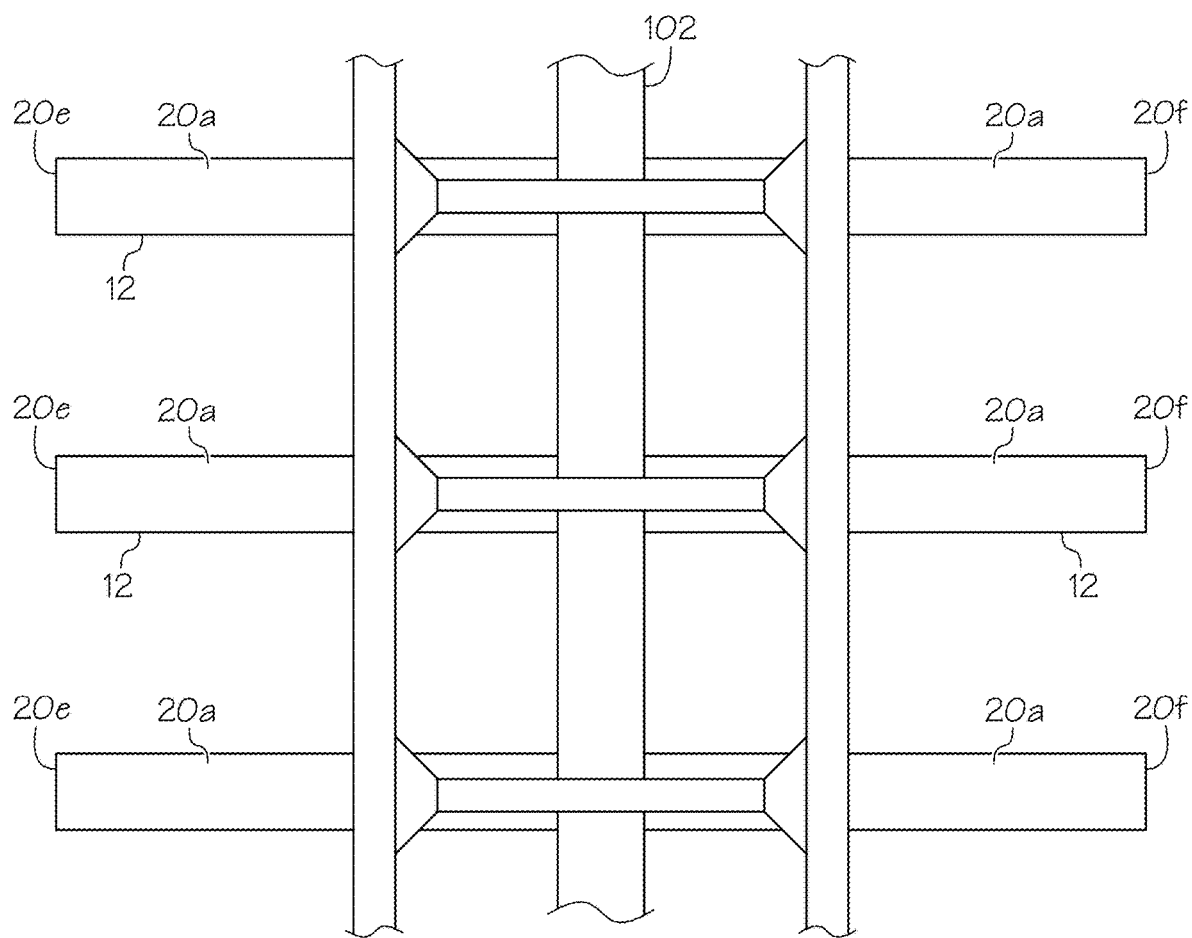
FIG. 8 is a top plan view of a sub-frame of a sub-frame and step assembly that is installed on a chassis of a truck. The bed of the truck is not shown in this view.

The invention provides an assembly 10 for installation on a truck 100. The assembly 10 includes a sub-frame 12 that is attachable to a chassis 102 of the truck 100 and a second component that is attachable to the sub-frame. The second component is or includes one or more steps 14, toolboxes 16, mechanical or electrical equipment, control panels, or any other component that might be installed on an exterior of a truck next to a bed of the truck. The truck 100 can be a tow truck or other commercial truck vehicle having a bed on which another vehicle or other cargo may be placed for transport. In exemplary embodiments, the assembly 10 is installed on a flatbed tow truck (also referred to herein as a flatbed truck) 100. The assembly 10 stabilizes the frame of the truck 100 and is useful for attaching other components to the truck. As shown in FIGS. 1-6B, the assembly 10 includes a sub-frame 12 that is attachable to a chassis (i.e., frame) 102 of the truck 100 as shown in FIGS. 7-8. As shown in FIG. 7, the assembly 10 can further include a step 14 that is connectable to the sub-frame 12. In some embodiments, the step 14 may be connected to the sub-frame 12 after the sub-frame is installed on the truck 100. In some embodiments of the assembly 10, a toolbox 14 or some other component may be connected to the sub-frame 12 without any step being connected thereto.

The sub-frame 12 is constructed from at least two chassis connection elements 18 and at least two support elements 20. The chassis connection elements 18 are attached to the chassis 102 of the truck 100, e.g., by welding, bolting, clipping, or a combination of two or more of the foregoing means. In some embodiments, some or all of the support elements 20 also are connected to the truck's chassis 102, e.g., by welding, bolting, clipping, or a combination of two or more of the foregoing means. In other embodiments, the support elements 20 are not connected to the truck's chassis.

The chassis connection elements 18 are arranged horizontally in parallel to one another and connected together via at least two support elements 20 attached at intervals perpendicularly to the chassis connection elements. In exemplary embodiments, the at least two chassis connection elements 18 are two longitudinal beams installed perpendicularly across a top surface 20a of each of a plurality of support elements 20 (e.g., at least two lateral beams) thereby forming a channel area between the at least two longitudinal beams 18. Lengthwise, the chassis connection elements 18 are oriented generally parallel to the chassis 102 when the sub-frame 12 is installed on the chassis. For convenience, in describing exemplary embodiments of the assembly 10 herein, the chassis connection elements 18 may be referred to as longitudinal beams 18 because they are oriented in length from end to end parallel to an axis running through the chassis 102 from a front end to a rear end of the truck 100. Likewise, for convenience, in describing exemplary embodiments of the assembly 10 herein, the support elements 20 may be referred to as lateral beams 20 because they are oriented in length from end to end perpendicular to an axis running through the chassis 102 from the front end to the rear end of the truck 100.

The chassis connection elements 18 are shaped as bars or beams in preferred embodiments. Each chassis connection element 18 has top and bottom sides 18a, 18b, left and right sides 18c, 18d, and first and second ends 18e, 18f. The left and right sides 18c, 18d of each chassis connection element 18 are each wider than the top and bottom sides 18a, 18b of the chassis connection element. The first and second ends 18e, 18f of each chassis connection element 18 can be the same height as its left and right sides 18c, 18d and the same width as its top and bottom sides 18a, 18b.

Figure 6A:
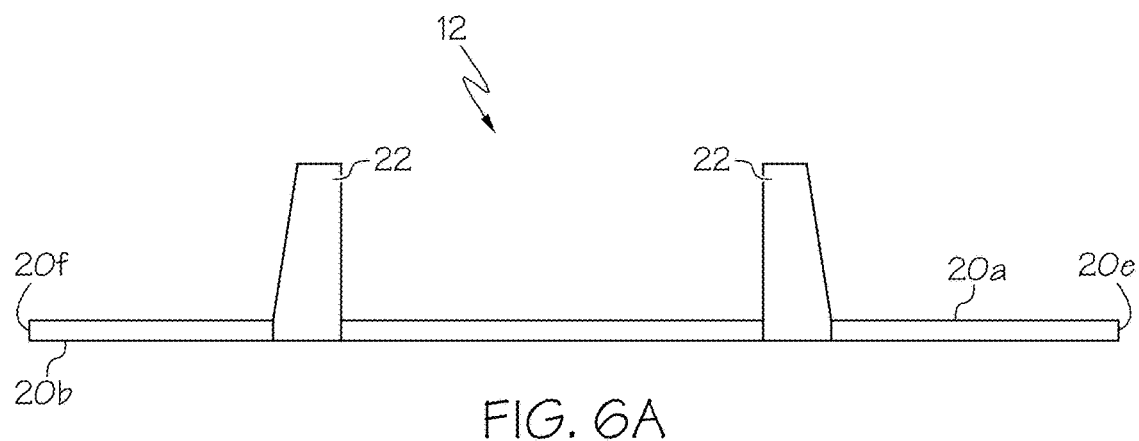
FIG. 6A is a front side elevation view of the sub-frame of FIG. 1.
Figure 6B:
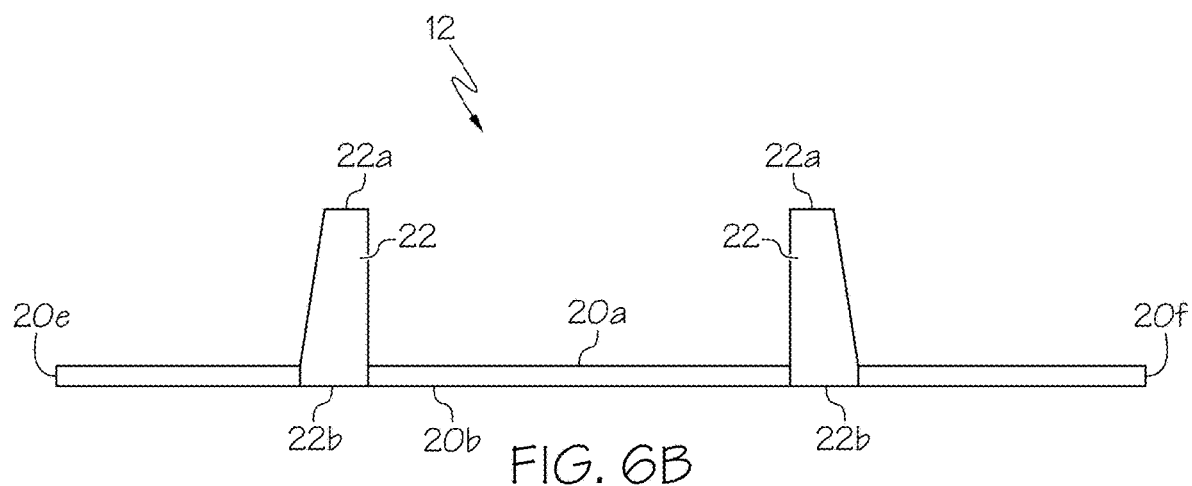
FIG. 6B is a rear side elevation view of the sub-frame of FIG. 1.

In some embodiments of the assembly 10 as shown in FIGS. 1, 6A, and 6B, each chassis connection element 18 includes an end plate 22 installed on at least one end. For example, an end plate 22 may be installed on the first end 18e of a chassis connection element 18 or on the second end 18f of the chassis connection element. In exemplary embodiments, end plates 22 may be installed on both the first and second ends 18e, 18f of each chassis connection element 18. In other embodiments, end plates 22 may be installed only on the first ends 18e of the two chassis connection elements 18 or only on the second ends 18f of the two chassis connection elements. In still other embodiments, an end plate 22 may be installed on the first end 18e of one chassis connection element 18 and on the second end 18f of the other chassis connection element 18.

Figure 2:
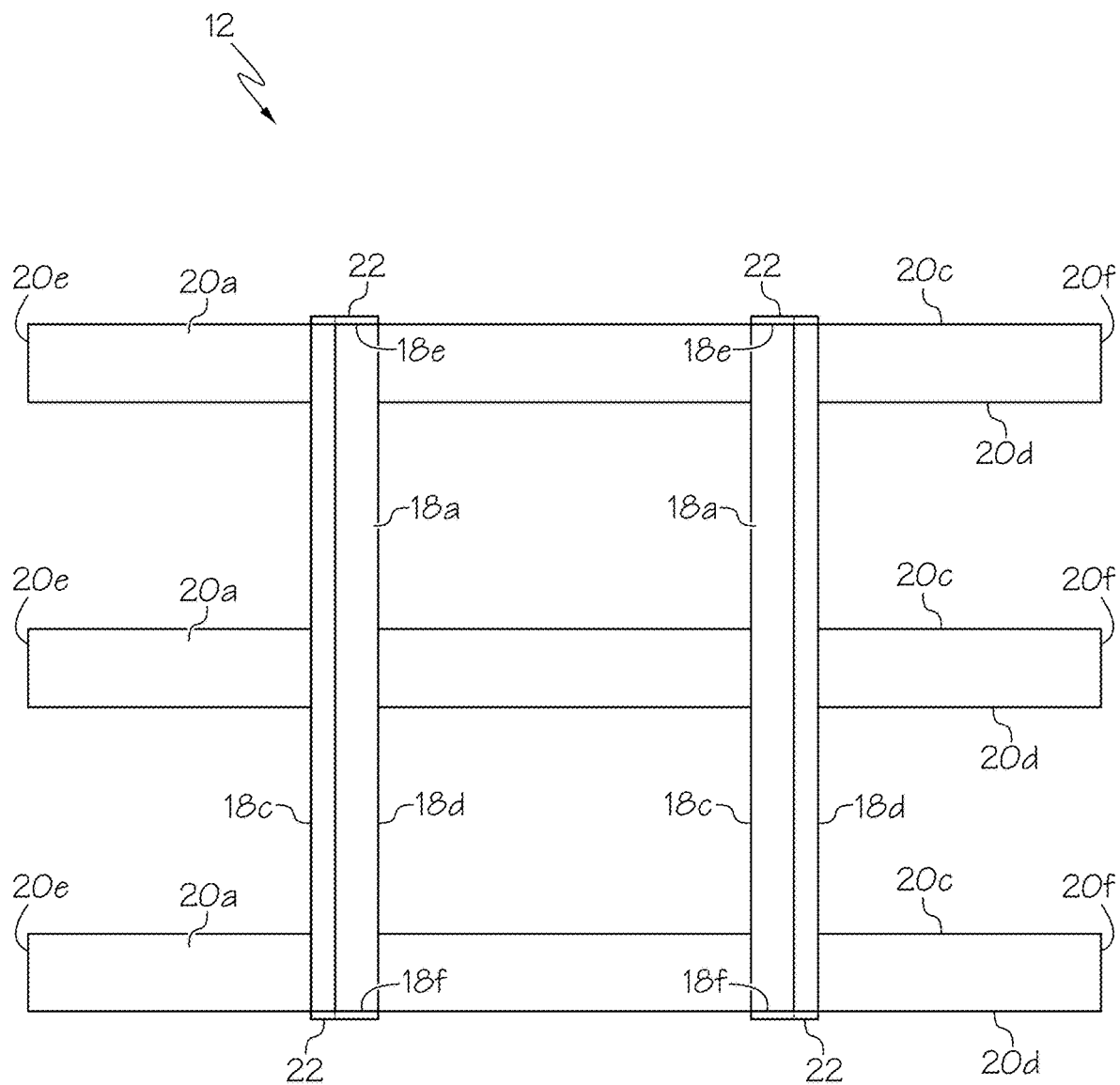
FIG. 2 is a top plan view of the sub-frame of FIG. 1.
Figure 3:
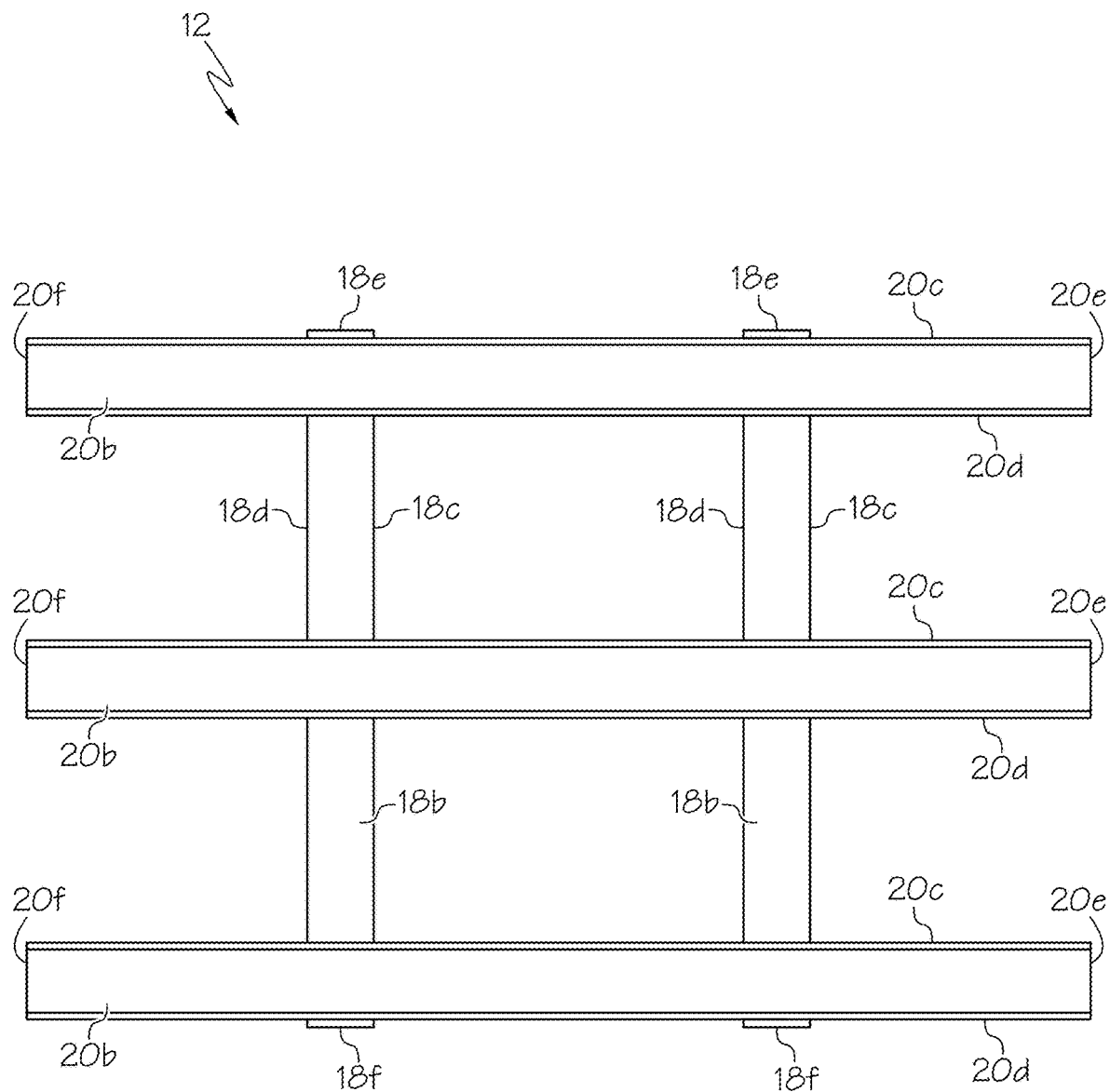
FIG. 3 is a bottom plan view of the sub-frame of FIG. 1.
Figure 4:
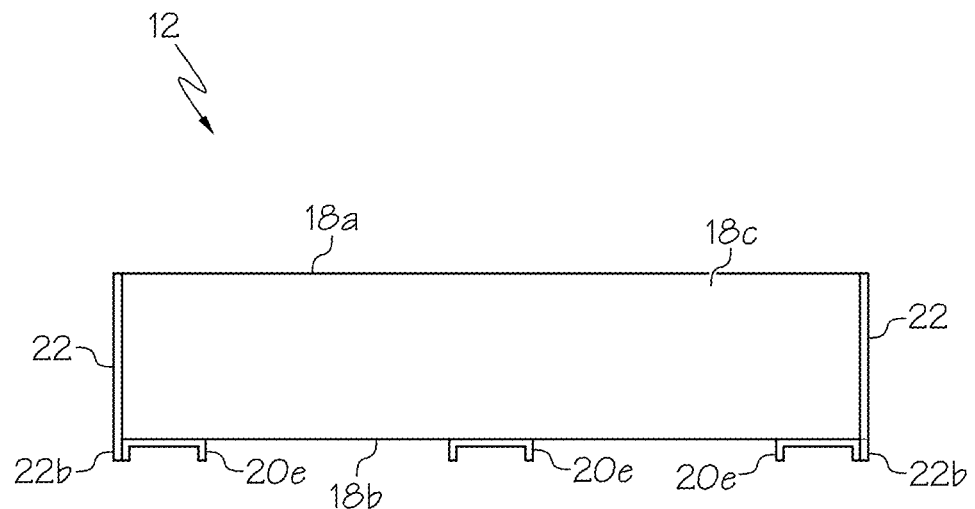
FIG. 4 is a left side elevation view of the sub-frame of FIG. 1.
Figure 5:
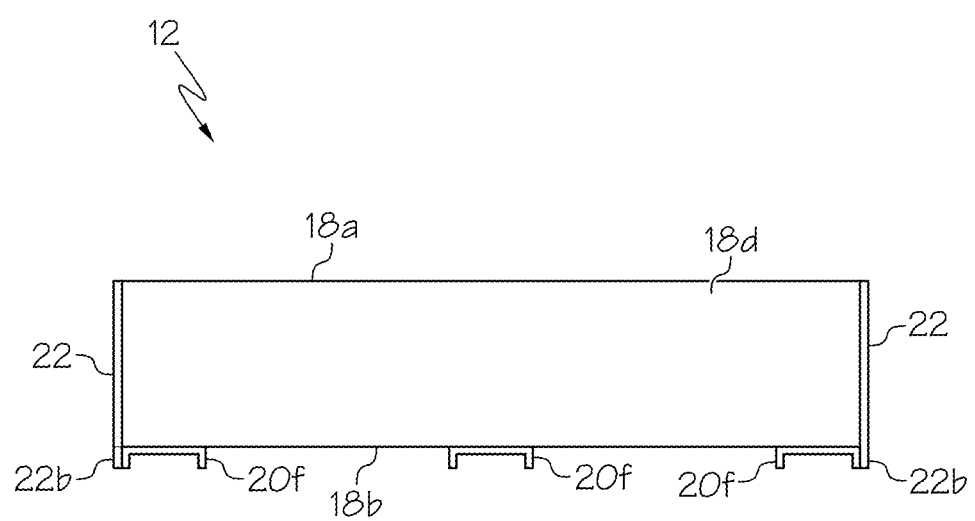
FIG. 5 is a right side elevation view of the sub-frame of FIG. 1.

The end plate 22 can be generally planar with a converging vertical surface profile, i.e., left and right sides of the end plate are nearer one another near a top portion 22a of the end plate while the left and right sides of the end plate at a bottom portion 22*b* of the end plate are more distant from one another. As shown in FIG. 1, a top end 22*a* of the end plate 22 can be flush with a top side of the chassis connection element 18 to which the end plate is attached. As also shown in FIG. 1, the end plate 22 can be longer than the height of the chassis connection element 18 to which it is attached so that a bottom portion 22*b* of the end plate extends beyond the bottom side 18*b* of the chassis connection element 18. The bottom end 22*b* of the end plate 22 may overlap a portion of the support element 20 to which its corresponding chassis connection element 18 is attached. A rear side 22*c* of the end plate's bottom end 22*b* is connectable to the left or right side (depending on which end of the chassis connection element 18 the end plate's support element 20 is connected) of the support element 20 that is attached to one end (i.e., the first end or second end 18*e*, 18*f*) of the corresponding chassis connection element 18. Each end plate 22 can form an integral part of the first and second ends 18*e*, 18*f* of the chassis connection elements 18 to which they are attached as shown in FIGS. 1-3.

The at least two support elements 20 are also shaped as bars or beams in preferred embodiments of the assembly 10. The at least two support elements 20 can each be a lateral beam, which when the sub-frame 12 is connected to the chassis 102 of the truck 100, are arranged lengthwise perpendicular to the chassis. Each support element 20 has top and bottom sides 20*a*, 20*b*, left and right sides 20*c*, 20*d*, and first and second ends 20*e*, 20*f*. As shown in FIG. 1, the top and bottom sides 20*a*, 20*b* of each support element 20 are each wider than the left and right sides 20*c*, 20*d* of the support element. The first and second ends 20*e*, 20*f* of each support element 20 can be the same height as its left and right sides 20*c*, 20*d* and the same width as its top and bottom sides 20*a*, 20*b*.

In exemplary embodiments of the sub-frame 12, three support elements 20 are attached to the two chassis connection elements 18: one support element attached on the bottom side 18*b* near or at each end 18*e*, 18*f* of each chassis connection element 18 (meaning two support elements 20, one installed at a first end 18*e* and another installed at a second end 18*f* of each chassis connection element) and the third support element 20 attached on the bottom side 18*b* near or at a center of each chassis connection element 20. In other embodiments of the sub-frame 12, the sub-frame can include one, two, four, five, six, seven, eight, or more support elements 20.

Once the two chassis connection elements 18 and the support elements 20 are assembled to create the sub-frame 12 (e.g., by welding, bolting, or production as a single unit using a mold), the first ends 20*e* of each support element 20 extend beyond the left side 18*c* of the left chassis connection element 18 and the second ends 20*f* of each support element 20 extend beyond the right side 18*d* of the right chassis connection element 20, as shown in FIG. 1.

The sub-frame 12 is attached to the chassis 102 of the truck 100 from underneath the truck. No disassembly of the truck is required in order to attach the sub-frame of the assembly. The sub-frame is positioned beneath the truck and is lifted into position for attachment to the truck's chassis. The sub-frame may be connected to the chassis by bolts and brackets (e.g., ear brackets), welding, a combination of the foregoing, or any other suitable means of connecting the sub-frame and chassis together. In exemplary embodiments of the sub-frame assembly having two chassis connection elements such as is shown in FIG. 1, one chassis connection element is connected to a left side of the chassis and another chassis connection element is connected to a right side of the chassis. Once connected to the chassis, the sub-frame serves to stiffen the chassis of the truck, thereby rendering it more stable.

In an alternate embodiment, rather than the sub-frame 12 being attached directly to the chassis 102 of the truck 100, the assembly 10 can include other connection members such as bars, beams, brackets, bolts, or a combination of two or more of the foregoing that are connected to the chassis at at least a first connection point and to the sub-frame at at least a second connection point. For example, the assembly can include two or more bars or beams that are attached to a top, a bottom, or a side surface of the chassis (or to a combination of two or more of those surfaces of the chassis) at a first connection point and to the sub-frame at a second connection point so that the bars or beams secure the sub-frame to the chassis without any direct connection of the sub-frame to the chassis. In another alternate embodiment, both the sub-frame and such other connection members may be directly connected at one or more connection points to the chassis with the connection members also being connected directly to the sub-frame.

Figure 10:
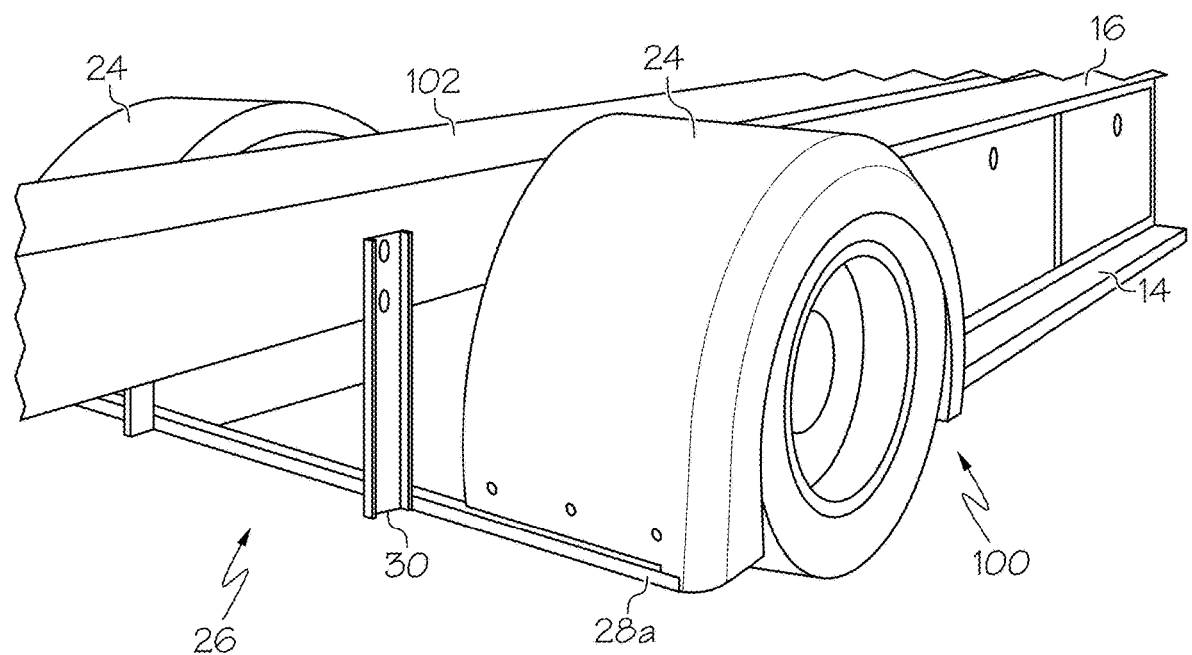
FIG. 10 is a perspective view of a rear bracket assembly attached to a chassis and to rear fenders of a truck.

After the sub-frame 12 is attached to the chassis 102, as shown in FIG. 7, a step 14 or step platform 14 may be attached to the first ends 20*e* of the support elements 20. As shown in FIGS. 7 and 10, a second step 14 or step platform 14 may be attached to the second ends 20*f* of the support elements 20. In this arrangement shown in FIG. 7, each side of the truck 100 include a step 14 connected to the sub-frame 12 so that a user may step onto and stand on the step to access the bed of the truck and any items located thereon (such as, for example, a vehicle sitting on the flatbed of a tow truck).

To install a step or step platform 14 onto the sub-frame 12, the step is placed upon the sub-frame so that the step is "floating," i.e., placed onto the top surfaces of the support elements but not yet attached thereto. Other items (e.g., a toolbox 16, a fender, or both) may be attached to the sub-frame, to the step, or to both. Such additional items may be positioned as desired and attached to the sub-frame before the step is attached. For example, a toolbox may be installed on the top surfaces of the support elements. After any such additional items have been installed and after the step has been centered, the step is attached (for example, by bolting and brackets) to the sub-frame.

In an exemplary embodiment, a step or step platform 14 can be placed onto the top surfaces 20*a* of the support elements 20 in floating configuration. The step 14 is centered on the sub-frame and then bolted onto the sub-frame. A toolbox 16 is bolted onto the step 14 and through the sub-frame 12 so that bolts extend through both the step and the sub-frame. Optionally, a fender (e.g., a rear fender 24) is bolted onto a rearward end of the step.

The sub-frame, step, bolts, and brackets of the truck sub-frame and step assembly are made from metal, e.g., steel. The toolbox and fender can be made from metal, plastic, fiberglass, or any other suitable materials. In some embodiments, the steps may also be made from materials other than metal such as, for example, plastic, fiberglass, or any other suitable materials.

The step assembly (which can include a step or step platform plus a toolbox or other second components) can be made in a left configuration for installation on left side of the truck and a right configuration for installation on the right side of the truck.

Figure 9A:
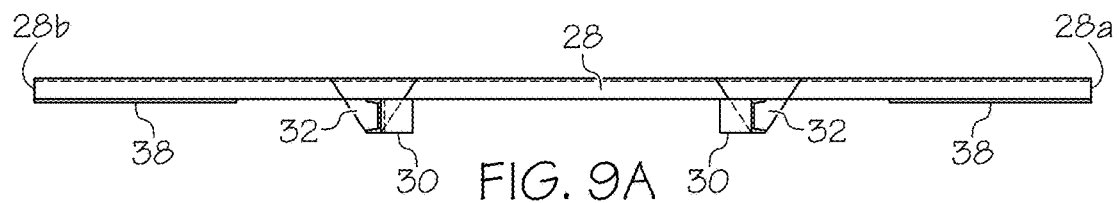
FIG. 9A is a bottom plan view of a rear bracket assembly for connecting to rear fenders of a truck, e.g., a flatbed truck.
Figure 9B:
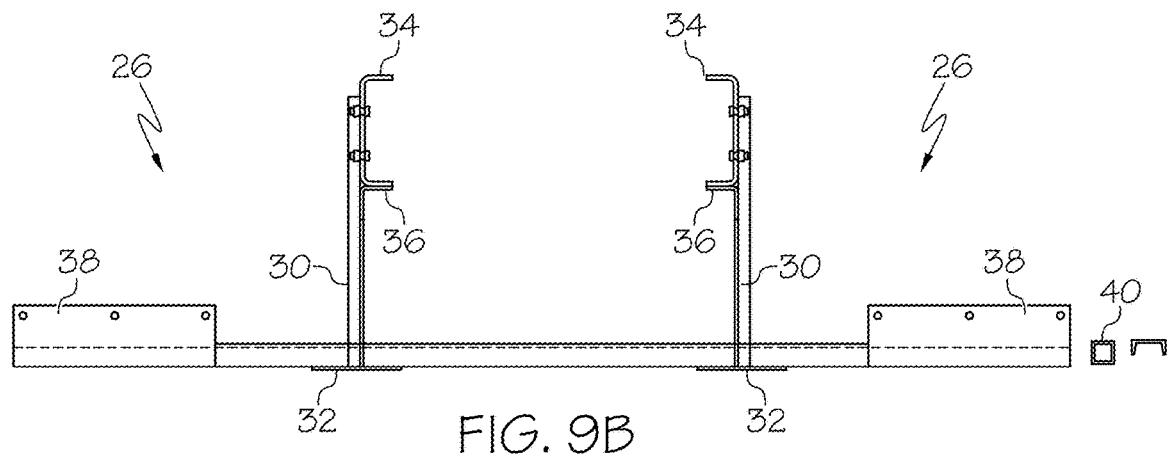
FIG. 9B is a rear side elevation view of the rear bracket assembly of FIG. 9A.
Figure 9C:
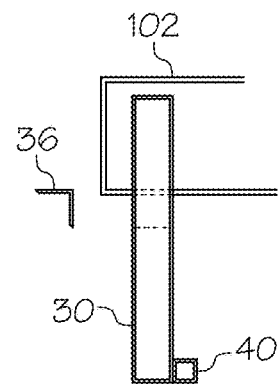
FIG. 9C is a right side elevation view of the rear bracket assembly of FIG. 9A attached to a chassis of a truck.

In another embodiment, the invention may further include a rear bracket assembly 26, as shown in FIG. 10, for attaching rear fenders 24 to the truck. The rear bracket assembly 26 serves to support the rear fenders 24 when they are installed on the truck 100. In most embodiments, the rear frame assembly 26 is a separate assembly that is not connected to the sub-frame 12, but instead, is attached to the truck's chassis 102 behind the rear axle to support the truck's rear fenders 24. As shown in FIGS. 9A-9C, the rear bracket assembly 26 includes a horizontal member 28 having a first end 28a and a second end 28b and two vertical members 30 attached to the horizontal member. The horizontal member 28 and the vertical members 30 are constructed from metal, e.g., steel tubing (which can be square in cross-section). As shown in FIGS. 9A and 9B, each vertical member 30 is attached at a different position equidistantly from the nearest end (i.e., first or second end 28a, 28b) of the horizontal member 28. As shown in FIGS. 9C and 10, the vertical members 30 of the rear bracket assembly 26 are attached to the truck's chassis 102, for example, a first vertical member is attached to a left side of the chassis and a second vertical member is attached to a right side of the chassis.

As shown in FIG. 9A, two gussets 32 may be welded to a bottom surface of the horizontal member 28, so that each gusset is connected to the horizontal member at a different location. The locations at which the gussets 32 are attached to the bottom surface of the horizontal member 28 correspondence to the positions at which the vertical members 30 are attached to the horizontal member. Lower ends of each vertical member 30 rest entirely or wholly on a top surface of their corresponding gussets 32. The gussets 32 provide additional support and stability to the connection between the vertical members 30 and the horizontal member 28.

As shown in FIG. 9B, a separate C channel 34 (i.e., C-shaped channel or bracket) is attached in a vertical orientation at or near a top end of each vertical member 30 of the rear bracket assembly 26, so that each vertical member has an attached C channel. The C channels 34 are attached to their respective vertical members 30 by bolts, welding, or any other suitable means. The C channels 34 attach the vertical members 30 to the truck's chassis 102. As shown in FIGS. 9B and 9C, a separate L-shaped bracket 36 can be installed in the space between a bottom surface of each C channel 34 and its lowest point of attachment to its corresponding vertical member 30. The L-shaped brackets 36 provide additional support and stability to the C channels' attachment to their respective vertical members 30 for attachment to the chassis 102. For purposes of illustration, a L-shaped 26 is shown in FIG. 9C detached from the vertical member 20.

As shown in FIG. 9B, each end 28a, 28b of the horizontal member 28 has a separate, corresponding fender mounting plate 38 attached thereto. For example, the first end 28a of the horizontal member 28 includes a first mounting plate 38 attached thereto and the second end 28b of the horizontal member 28 includes a second mounting plate 38 attached thereto. Each mounting plate 38 may have a separate connection element 40 attached to it to provide an additional point of connection and support between the rear bracket assembly 26 and each rear fender 24. Thus, a first connection element 40 is attached to the first mounting plate 38 and a second connection element 40 is attached to the second mounting plate 38. The truck's left fender 24 is attached to and/or supported by the first mounting plate 38, the first connection element 40, or both, while the truck's right fender 24 is attached to and/or supported by the second mounting plate 38, the second connection element 40, or both. For purposes of illustration, a connection element 40 is shown in FIG. 9C detached from the horizontal member 28.

In still another embodiment, the rear fenders 24 may be attached to rearward ends of the chassis connection elements 18 or to a rearward end (e.g., the second end) of each step 14. In other embodiments having only a half fender at the rear of the truck, the rear bracket assembly may be omitted.

The invention also relates to a kit for adding a second component (e.g., a step or step platform, a toolbox, or any other second component described herein) to a flatbed truck. The kit includes a sub-frame connectable on a chassis of a truck and at least one second component selected from among those described elsewhere herein. For example, the second component of the kit can include at least one step assembly connectable to the sub-frame at a height that allows access by a user standing thereon to a bed of the truck. As a further example, the kit may include left, right, or both left and right step assemblies, toolboxes, or both. The kit may also include a rear bracket assembly for attaching rear fenders to the truck. In some embodiments, the rear fenders may also be provided as part of the kit. The kit allows after-market installation for customization of an existing truck.

The invention also relates to a system that includes the assembly 10 (i.e., a sub-frame 12 and one or more of the second components as described elsewhere herein) and a truck 100 as described herein. The system may also include a rear bracket assembly and rear fenders.

The invention also relates to methods for enabling access to a bed of a flatbed truck. One method includes the steps of installing a sub-frame to a chassis of a truck, and connecting at least one step assembly to the sub-frame at a height that allows access by a user standing thereon to a bed of the truck.

The invention also relates to methods for constructing an assembly and also to methods for installing an assembly (including one or more of the various second components) to a truck as described elsewhere herein.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A sub-frame and step assembly comprising:
   a sub-frame capable of installation on a chassis of a truck; and
   at least one step assembly connected to the sub-frame at a height that allows access by a user standing thereon to a bed of the truck;
   wherein the sub-frame fits longitudinally around a bottom surface of the chassis of the truck so that, when installed, a channel area of the sub-frame at least partially surrounds the chassis and extends parallel to the chassis.
2. The sub-frame and step assembly of claim 1, wherein the sub-frame comprises:
   at least two lateral beams; and at least two longitudinal beams installed perpendicularly across a top surface of each of the at least two lateral beams forming a channel area between the at least two longitudinal beams.

3. The sub-frame and step assembly of claim 1, wherein the sub-frame comprises:
   three lateral beams; and
   two longitudinal beams installed perpendicularly across a top surface of each of the lateral beams forming a channel area between the at least two longitudinal beams.

4. The sub-frame and step assembly of claim 2, wherein each lateral beam comprises top and bottom surfaces having a width that is greater than a height of each side surface of each lateral beam.

5. The sub-frame and step assembly of claim 2, wherein each longitudinal beam comprises left and ride sides having a height that is greater than a width of top and bottom surfaces of each longitudinal beam.

6. The sub-frame and step assembly of claim 1, wherein the sub-frame is installed by connection to a bottom surface of the chassis of the truck.

7. The sub-frame and step assembly of claim 1, wherein the channel area is a space having sides defined between the at least two longitudinal members and a bottom defined by the at least two lateral members connected perpendicularly across a bottom surface of each longitudinal member.

8. The sub-frame and step assembly of claim 1, further comprising a toolbox installed on the sub-frame.

9. The sub-frame and step assembly of claim 1, wherein the truck comprises a flatbed tow truck.

10. The sub-frame and step assembly of claim 1, wherein the at least one step assembly comprises a horizontal platform on which the user steps up and onto and stands or walks upon for accessing the bed of the truck, an object on the bed, or a toolbox connected to the truck.

11. A truck comprising:
    a sub-frame installed on a chassis of the truck; and
    at least one step assembly connected to the sub-frame, the at least one step assembly comprising a standing platform, a toolbox, or both;
    wherein the sub-frame fits longitudinally around a bottom surface of the chassis of the truck so that, when installed, a channel area of the sub-frame at least partially surrounds the chassis and extends parallel to the chassis.

12. The truck of claim 11, wherein the sub-frame comprises:
    at least two lateral beams; and
    at least two longitudinal beams installed perpendicularly across a top surface of each of the at least two lateral beams forming the channel area between the at least two longitudinal beams.

13. The truck of claim 12, wherein each lateral beam comprises top and bottom surfaces having a width that is greater than a height of each side surface of each lateral beam.

14. The truck of claim 12, wherein each longitudinal beam comprises left and ride sides having a height that is greater than a width of top and bottom surfaces of each longitudinal beam.

15. The truck of claim 11, wherein the sub-frame is installed by connection to a bottom surface of the chassis of the truck.

16. The truck of claim 15, wherein the channel area is a space having sides defined between at least two longitudinal members and a bottom defined by at least two lateral members connected perpendicularly across a bottom surface of each longitudinal member.

17. A kit for adding a step platform to a flatbed truck, the kit comprising:
    a sub-frame connectable on a chassis of a truck; and
    at least one step assembly connectable to the sub-frame at a height that allows access by a user standing thereon to a bed of the truck;
    wherein the sub-frame fits longitudinally around a bottom surface of the chassis of the truck so that, when installed, a channel area of the sub-frame at least partially surrounds the chassis and extends parallel to the chassis.

18. A method for enabling access to a bed of a flatbed truck, the method comprising the steps of:
    (a) installing a sub-frame to a chassis of a truck; wherein the sub-frame fits longitudinally around a bottom surface of the chassis of the truck so that, when installed, a channel area of the sub-frame at least partially surrounds the chassis and extends parallel to the chassis; and
    (b) connecting at least one step assembly to the sub-frame at a height that allows access by a user standing thereon to a bed of the truck.

* * * * *